Aug. 15, 1950

C. C. WATSON 2,518,583

CATALYTIC REACTOR

Filed June 27, 1945

Inventor:
Charles C. Watson
By Lee J. Gary
Attorney

UNITED STATES PATENT OFFICE 2,518,583

CATALYTIC REACTOR

Charles C. Watson, Evanston, Ill., assignor to Universal Oil Products Company, Chicago, Ill., a corporation of Delaware Application June 27, 1945, Serial No. 601,756

2 Claims. (Cl. 23—288)

This invention relates to an improved form of catalytic reactor, particularly of the elongated or tubular type. This type of reactor employs a fixed bed of catalytic contact material for directing or promoting a desired reaction and for effecting intimacy of contact between reactants and this catalytic contact material.

One object of this invention is to provide an improved method for regenerating or reactivating catalysts beds in the tubular type of reactor.

Another object of this invention is to provide an improved tubular reactor having a reactivating gas distributing means which gives a specifically proportioned flow of oxidizing gas to the catalyst bed during the reactivating cycle.

A further object of the invention is to provide an auxiliary inert gas stream to control the rate of movement or mass velocity of the distributed reactivating gas stream within the catalyst bed and to effect an improved transfer of the heat of combustion, which is generated during the reactivating process, to the tube walls; and to limit the temperature rise of the catalyst through the heat capacity of this auxiliary gas stream.

A still further object of the invention is to provide an annular channel around the catalyst containing reaction tube for the flow of a fluid stream in heat exchange relationship with the reaction tube.

Tubular type reactors having long narrow fixed beds of catalysts are preferable in certain hydrocarbon conversion processes such as, for example, the dehydrogenation of butane to butylene, or butylene to butadiene. The processing or conversion reaction of the catalytic dehydrogenation process is endothermic, requiring heat transfer to a relatively high mass velocity stream of the hydrocarbon charge, therefore long narrow catalyst beds in tubular type of reactors are particularly suitable for this service.

In most hydrocarbon conversion processes where a fixed bed of catalyst is used, there will be a carbon deposition on the catalyst particles during the processing period which acts to reduce the catalyst activity. This carbon deposit may be burned off by circulating an oxygen containing gas over the catalyst, therefore any fixed bed of catalyst in a reactor is alternately employed in processing and then subjected to a reactivating or regenerating operation. In a commercial plant in order to have continuous processing, a plurality of reactors are usually employed in a tube bank and at least two tube banks used in the plant. By means of suitable switch valves, one reactor tube bank is kept in processing service while the other is being reactivated by having the carbon burned off. At specified intervals, the reactors may be automatically switched by a time-cycle controller.

For example, during the processing operation of a dehydrogenation unit, normal butane is pumped into a heat exchanger and heater where it is raised to approximately 1050° F. and then is directed by means of switch valves to a processing reactor tube bank. As the butane enters the reactor tubes the reaction begins to take place and it is necessary at this point to add heat if the reaction is to be carried forward at the desired rate. This heat is added by circulating hot flue gas around the outside of the catalyst tubes. After the flue gas leaves the reactor, it is conducted through ducts back to a fan, which discharges it through a heater and back into the reactor. The flue gas is directed to the proper reactor by means of automatic switching means located in the inlet to each reactor, and its temperature is controlled by automatic regulation of fuel gas flow to the heater. The material leaving the catalyst tubes is composed of unreacted butane, butylene, hydrogen and a small percentage of other light gases.

In the reactivating operation, a reactivating gas of controlled oxygen content and of sufficient volume is furnished to permit burning off of carbon deposited on the catalyst, without reaching excessively high temperatures. The use of straight air for reactivation results in temperatures far in excess of 1300° F., which would substantially reduce the activity of the usual dehydrogenation catalyst within a relatively short time. By the control of the oxygen content of the reactivating gas to between 1 and 3%, it is possible to burn off all the carbon within the allotted time without exceeding 1300° F., or the maximum allowable temperature for the catalyst.

The burning of the carbon inside the catalyst tube produces heat which must be dissipated. Part of this heat is absorbed by raising the temperature of the reactivating gas itself from 800° F. to approximately 1200° F., the remainder is absorbed by a flue gas cooling stream which is passed around the outside of the catalyst tubes. This cooling medium may be directed by suitable switching means to the reactivating tube bank.

This invention which particularly relates to the reactivation phase, provides a reactivating gas distributing tube placed centrally in the catalyst tubular reactor. The distributing tube has a plurality of openings which are positioned and so proportioned from one end to the other, that a uniformly high temperature is achieved throughout the entire length of the catalyst bed during the reactivating cycle. A greater number of openings, or larger openings, are placed at the inlet end of the reactor tube such that the rate of oxygen supply and rate of combustion in the catalyst bed will be gradually diminished from the inlet end to the outlet end of the bed.

In order to control and aid the transfer of heat generated from the exothermic reactivating process, to the tube walls, an auxiliary inert gas stream is provided to flow longitudinally through the catalyst bed during the reactivating cycle. This inert gas stream follows the same flow path as the reactant gas stream and therefore may be charged to the reactor through the same inlet as that used by the reactants. The change in the charge streams from processing to reactivating may be accomplished by proper placing of valves or the use of suitable switch valves. This relatively inert gas stream, containing little or no oxygen, flows in conjunction with the distributed oxidizing gas stream for the duration of the reactivation period and in addition is provided at a relatively high mass velocity so that the best possible transfer of the heat of combustion to the outer tube wall may be obtained.

By effecting a relatively uniform reactivation temperature in the catalyst bed it is possible to approach the given maximum allowable catalyst temperature and thereby attain a maximum carbon burning and uniform carbon removal from the particles in the bed.

A tubular sleeve placed around and spaced away from the catalyst containing reaction tube is also provided with this improved tubular reactor to form an annular, confined channel for the heating or cooling medium to flow in controlled heat exchange relationship with the reaction tube. For the processing period within the catalyst bed a hot fluid medium may be passed through the annular flow channel to furnish heat for an endothermic reaction, and a less hot cooling medium may be passed therethrough during the exothermic reactivation period. It is further known that there is an optimum size sleeve which provides the most advantageous heat exchange relationship.

There are at present various forms of reactor tubes which have been devised and are in use. Distribution improvements have also been made to the elongated or tubular type of reactors; however, such improvements have primarily been for the purpose of decreasing the pressure drop of the fluids flowing therethrough. In general, present types of tubular reactors are constructed so that the reactivating gas stream must follow the same flow path that the processing gas stream travels during the conversion cycle. However, with long narrow fixed catalyst beds such as contained in reactors of the tubular type wherein alternating endothermic and exothermic processes occur, it is more desirable and efficient to provide different flow paths, such as provided by this invention. In this invention the perforated reactivating gas distributing tube which extends longitudinally into the catalyst bed is provided not so much for pressure drop reduction, but for the purpose of acquiring uniform oxidation and a uniform high temperature throughout the bed. During the reactivation process of present solidly packed tubes, containing catalyst such as is used in the dehydrogenation of hydrocarbons, combustion proceeds in a relatively narrow zone, when all the oxygen is introduced at the inlet to the bed. Thus, high local catalyst temperatures are reached in this zone, the remainder of the tube being relatively ineffective for removing the heat of combustion.

Briefly, this invention embodies means for improving the reactivation of a catalyst bed in a tubular type reactor, the means comprise providing a centrally positioned distributing tube having perforations which decrease in number throughout the length of the catalyst bed, an inert gas stream passing at a relatively high velocity through the elongated catalyst bed, and an enclosing sleeve around the catalyst retaining reaction tube to accommodate a heat exchange fluid stream which is passed externally around the reactor tube to flow concurrently with the internal inert gas stream and longitudinally with the catalyst bed.

The accompanying drawing and description thereof should make more apparent the features comprising the improved reactor tube and reactivation method.

Figure 1:
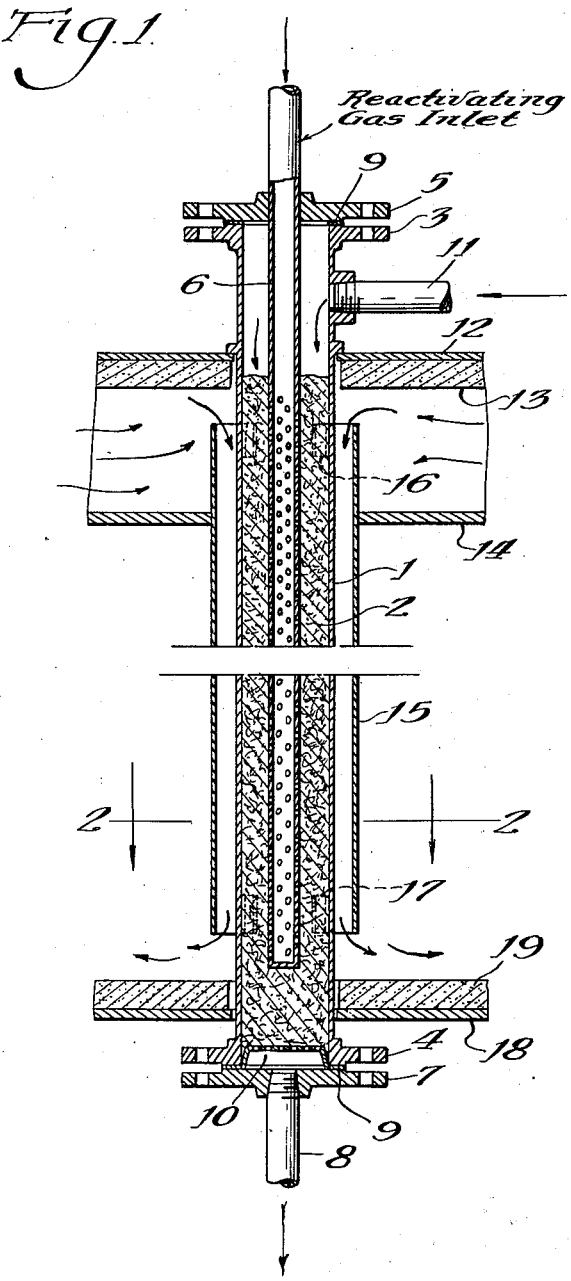
Figure 1 shows one form of tubular reactor provided by the invention in a sectional elevational view.

Referring to the drawing, the tube 1 contains a bed 2 of catalytic material and forms an elongated reaction tube. A plurality of these tubes or tubular assemblies in a tube bank, are normally used in a commercial plant, each of the tubes in a given bank being connected to common header conduits and operating simultaneously. The tube 1 is provided with flanges 3 and 4 at the top and bottom ends, respectively. The upper flange 3 on the tube 1 has a companion flange or cover 5 which forms an end closure to the chamber, at the same time it is fixedly attached to a gas inlet and distribution tube 6, which extends therethrough and which is perforated by a plurality of small holes or slots. The tube 6 extends into and substantially all the way through the catalyst bed 2. The perforated holes in the tube 6 as previously noted are not necessarily equally spaced throughout the embedded length. Since this distribution tube functions to effect a substantially uniform reactivation temperature in the catalyst bed it is desirable to vary or proportion the hole spacing, having a greater number of holes near the upper part of the bed. Thus, the rate of oxidation will be somewhat less at the lower end of the bed. However, the catalyst bed temperature will be increased in the lower portion by the downward movement of hot gases from above so that the net effect is a relatively uniform temperature throughout the elongated bed.

The lower flange 4 has a companion flange or cover 7 which forms a bottom closure member. An outlet conduit tube 8 is connected to this lower cover member 7, and may be used to alternately remove conversion products and reactivation combustion products from the catalyst bed 2 and reaction tube 1.

The companion flanges 5 and 7 may be attached by suitable bolts, not illustrated, to their respective tube flanges 3 and 4, also, suitable gaskets 9 are provided between each of the companion flanges. A perforated plate or screen-like member 10 is provided just above the bottom cover 7 and over the outlet conduit 8. This plate 10 serves to support and retain the catalytic material within the tube 1, preventing it from carrying into the outlet pipe 8. When it is desired to remove the bed of catalytic material, it can be removed or dumped by detaching the cover 7 and allowing the perforated plate 10 to fall out. The removable upper cover plate 5 is particularly advantageous from the standpoint of providing ready means to place catalyst into the tube 1, or to refill the reactor tube 1 with catalytic material when it has been dumped. Reactant or reactivation fluids or other materials may be charged to the reactor tube by way of the upper side inlet conduit 11.

As previously noted, in a commercial plant, reactor tube assemblies such as in the Figure 1, are normally used in plurality, at least one bank of tubes in a common cell are processing simultaneously while another tube bank in a different cell has tubes being simultaneously reactivated. Thus, in any reactor tube bank, each of the tubes 6, 8, and 11 will connect to headers which in turn are connective with each reaction tube assembly in the reactor bank.

In the drawing, the plate 12 indicates a tube sheet or support plate at the upper end of a cell containing a plurality of tubes 1. The plate 12 is provided with an insulating material 13 which is suitable for the temperature to be encountered. The plate 14 provides a baffle within the cell, in order that the heating or cooling gases which are employed will be channeled through the annular space between tube 1 and sleeve 15. In a tube bank where there is a plurality of tubes, a more equal distribution of gases, a greater uniformity in tube temperatures, and an improved heat transfer rate is accomplished by the use of sleeves 15 around each of the reactor tube assemblies. The sleeve 15 may be fixedly attached to the tube 1 by spaced lugs or web plates 16 at the upper supported end of the tube 1, while spacer bars 17 attached to the lower end of tube 1 will serve to keep the sleeve 15 in proper alignment and at the same time permit differential expansion to take place between the two tubes.

A lower tube sheet 18 having insulation 19 is provided near the lower end of the tube 1 to form the bottom of the enclosing cell or chamber. The general arrangement shown, with the baffle plate 14 near the top, and the directional arrows, indicate the flow path of the heating (or cooling) gases to be in at the top of the sleeve 15 and out at the lower end, such that concurrent flow is obtained with the processing or reactivating gases which also are charged to the tube 1 at the upper end. Of course, it may be desirable for certain processing or reactivating operations to have the heating or cooling gas flow upward to effect countercurrent heat exchange relationship with the internal flow.

Figure 2:
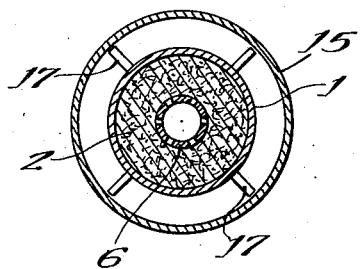
Figure 2 shows a sectional plan view through the reactor tube as indicated by line 2—2 in Figure 1.

Figure 2 of the drawing shows a conventional section through the tubular reactor as indicated by the line 2—2 of Figure 1. The various parts are numbered to correspond to the reference numerals attached in the elevational view, Figure 1.

To illustrate the operation of the improved type reactor tube, let it be assumed that it is to be employed in a process of catalytic butane dehydrogenation, which means the removal of hydrogen from butane in the presence of a suitable catalyst to form butylene and hydrogen. The reaction is carried out in the tube 1 at temperatures ranging from approximately 1000° F. to 1100° F. and pressures ranging from approximately ten to fifty pounds per square inch.

During the dehydrogenation processing period, normal butane which has been heated to reaction temperature of approximately 1050° F. is charged to the top of the tube 1 by way of inlet conduit 11. As the butane enters the catalyst bed 2, the reaction begins to take place; and in order for the reaction to be carried forward at the desired rate, heat must be added. Heat is furnished by hot flue gases which are passed to the reactor cell and circulated through the space provided between tube 1 and sleeve 15. The hot external flue gas is brought to the annular flow channel within sleeve 15 at approximately 1450° F., it gives up heat to the endothermic reaction inside the reaction tube 1 and leaves the lower end of sleeve 15 at a temperature of approximately 1250° F. The butane passes downward through the annular shaped catalyst bed 2 and the reaction products or material, leaving the tube by way of outlet conduit 8, is composed of unreacted butane, butylene, hydrogen and a small amount of other light gases. In this processing operation a carbon deposit is left on the catalyst particles, such that its activity is reduced and regeneration is then required.

During the reactivating period, the carbon deposit is removed from the catalyst by a burning-off or oxidizing process. As previously noted, this reactivating operation must be closely controlled to prevent overheating the catalyst and at the same time effect a high temperature for an efficient reactivation. The ideal condition is to obtain an approximately constant or uniform temperature throughout the length of the catalyst bed, without effecting a detrimental temperature buildup at some point in the bed. In the improved apparatus and method of reactivation of this invention the reactivating gas containing a controlled small percentage of oxygen is charged by way of conduit 6 to the catalyst bed. This conduit 6 having perforations so proportioned in its embedded length that a uniform temperature is obtainable, makes it possible to effect as high an allowable temperature, without impairing catalyst activity. Cooling gas is circulated to the sleeve 15 to aid in carrying away and dissipating the heat produced by the oxidation inside the catalyst bed 2. A relatively inert gas, having very little if any oxygen content, is passed by way of inlet conduit 11 into the upper end of tube 1 and flows for the same period as the reactivating gas stream. This inert gas stream is passed at a relatively high velocity in order to effect good transfer of heat of combustion to the tube wall 1. The cooling gas stream entering the top of sleeve 15 may be flue gas provided at a temperature of approximately 900° F. and leaving the bottom of the cell at about 1200° F.

With the rate of oxygen supply being proportioned by the new distribution tube 6 so that there is a gradual decrease from top to bottom of the bed, there is therefore, a corresponding gradual decrease in the rate of combustion. The rate of heat transfer from the tube to the cooling gas similarly decreases, although of course it should be noted, the temperature of the cooling gas itself gradually increases from top to bottom in sleeve 15 due to absorbed heat. The total effect, or resulting operation is that a more constant or relatively uniformly heated catalyst bed is obtained.

Switching valves or means not shown, will of course be required on each of the inlet and outlet conduits so that proper change-over can be easily made from the processing to the reactivating cycle and vice versa.

Although the operation of this reactor tube has been described in connection with the dehydrogenation process, it is not intended to limit the improvement in the tubular reactor to this use only. Other fixed bed catalytic conversion processes may well make use of a similar reactor. Also, it is not intended to limit the invention to the exact form of apparatus as shown, as obviously many variations in construction details and form may be made and still come within the scope of the invention.

I claim as my invention:

1. A reactor comprising a tubular housing having a reactant inlet at one end thereof and a product gas outlet at its opposite end, a longitudinally perforated regenerative gas conduit within and spaced from the wall of said housing and substantially coextensive in length with the housing, the total area of the perforations per unit length of the regenerative gas conduit gradually and successively decreasing from the reactant inlet to the product gas outlet, means for retaining a solid contact material in the space between said conduit and housing, an open-ended tubular sleeve spaced from and surrounding a substantial portion of said housing, and means for passing a heat exchange medium through the space between said sleeve and housing.

2. The reactor of claim 1 further characterized in that the number of perforations per unit length of said conduit decreases from said inlet to said outlet.

CHARLES C. WATSON.

REFERENCES CITED

The following references are of record in the file of this patent:

UNITED STATES PATENTS

| Number | Name | Date |
|---|---|---|
| 1,782,435 | Merriam | Nov. 25, 1930 |
| 1,828,146 | Joseph | Oct. 20, 1931 |
| 1,989,927 | Houdry | Feb. 5, 1935 |
| 2,042,469 | Joseph | June 2, 1936 |
| 2,073,638 | Houdry | Mar. 16, 1937 |
| 2,162,893 | Kuhl | June 20, 1939 |
| 2,278,892 | Nagle et al. | Apr. 7, 1942 |
| 2,336,879 | Mekler | Dec. 14, 1943 |